United States Patent
Kubsch et al.

(10) Patent No.: US 7,543,022 B2
(45) Date of Patent: Jun. 2, 2009

(54) METHOD FOR MANAGING ELEMENTS OF A PEER-GROUP

(75) Inventors: Stefan Kubsch, Hohnhorst (DE); Meinolf Blawat, Hannover (DE); Uwe Janssen, Seelze (DE); Wolfgang Klausberger, Hannover (DE); Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 540 days.

(21) Appl. No.: 11/217,913

(22) Filed: Sep. 1, 2005

(65) Prior Publication Data

US 2006/0045092 A1  Mar. 2, 2006

(30) Foreign Application Priority Data

Sep. 1, 2004  (EP)  .................................. 04020701

(51) Int. Cl.
*G06F 15/16*  (2006.01)
(52) U.S. Cl. .................. 709/204; 709/206; 709/223; 709/229; 307/395.3
(58) Field of Classification Search .................. 709/204, 709/206, 223, 229; 370/395.3
See application file for complete search history.

(56) References Cited

U.S. PATENT DOCUMENTS

| | | | | |
|---|---|---|---|---|
| 5,365,523 | A * | 11/1994 | Derby et al. .................. 370/402 |
| 7,068,789 | B2 * | 6/2006 | Huitema et al. ............. 380/277 |
| 2002/0002491 | A1 * | 1/2002 | Whitfield ...................... 705/14 |
| 2002/0029263 | A1 * | 3/2002 | Toyoshima et al. .......... 709/223 |
| 2002/0129095 | A1 * | 9/2002 | Hatalkar ...................... 709/203 |
| 2002/0184310 | A1 * | 12/2002 | Traversat et al. ............ 709/204 |
| 2003/0041138 | A1 | 2/2003 | Kampe et al. |
| 2003/0055892 | A1 * | 3/2003 | Huitema et al. ............. 709/204 |
| 2004/0066770 | A1 * | 4/2004 | Pabla et al. .................. 370/338 |
| 2004/0192189 | A1 * | 9/2004 | Yuhara et al. ............... 455/3.02 |
| 2005/0063419 | A1 * | 3/2005 | Schrader et al. ............. 370/466 |

FOREIGN PATENT DOCUMENTS

WO  WO 02/057917 A2  7/2002

OTHER PUBLICATIONS

EP search report dated Feb. 1, 2005.

* cited by examiner

*Primary Examiner*—Liangche A Wang
*Assistant Examiner*—Andrew Georgandellis
(74) *Attorney, Agent, or Firm*—Robert D. Shedd; Joseph J. Opalach; Jerome G. Schaefer

(57) ABSTRACT

For the creation and self-organization of peer-groups the JXTA protocol may be used, which includes messages such as peer or peer-group advertisements and services such as the discovery service. Conventional peer-groups of this type are static and need restart after any modification, e.g. a new service. A method for dynamically managing hardware and/or software elements, e.g. services, utilized and/or offered by such peer-groups comprises detecting a change within a peer-group, creating a new peer-group identifier, publishing within the peer-group a first peer-group advertisement message that includes the current and the new peer-group identifier and pointers to current services including the detected modification, accepting the new peer-group identifier by the other peer-group members, and publishing a second peer-group advertisement message in the superordinate peer-group, wherein both advertisement messages may be identical. Thus, peer-groups may operate continuously while peers modify, add or delete services.

9 Claims, 3 Drawing Sheets

METHOD FOR MANAGING ELEMENTS OF A PEER-GROUP

This application claims the benefit, under 35 U.S.C. § 119 of EP Patent Application 04020701.1, filed Sep. 1, 2004.

FIELD OF THE INVENTION

This invention relates to a method for managing elements of a peer-group. In particular these elements may be software and/or hardware elements, and the peer-group has a common group identifier assigned.

BACKGROUND

Peer-to-Peer technologies are increasingly important in the computing world. Instead of traditional client server based computing systems, peer-to-peer technologies are often preferred for many reasons, such as error resilience, cost, scalability, etc. Peer-to-peer techniques are often developed targeting at PC platforms, intended for large communities connected through the Internet. Solutions facing different application areas, e.g. home networks, have different or additional requirements that have not fully been taken into account yet. One common approach for peer-to-peer technology, known as JXTA, is described in WO02/057917. JXTA defines an open, generalized protocol that inter-operates with any peer on the network, for easy development of basic building blocks and services that enable innovative applications for peer groups. E.g. a peer can offer a service by itself or in co-operation with other peers. JXTA offers the concept of grouping peers into a so-called peer-group, using the mentioned peer-to-peer protocols. In the European Patent application EP1427149 this concept is used for the creation of peer-to-peer based home networks, so-called OwnerZones. Before launching a peer-group, all group characteristics and the group software components, also called peer-group services, need to be defined. The peer-group characteristics such as peer-group name, peer-group ID, service description or group description are determined upon creation of the peer-group. After creation of the peer-group however its characteristics cannot be altered. Such static peer-groups are well suited for Internet based applications targeting large audiences, but are of great disadvantage for dynamic peer-groups, where peer groups may frequently change their group characteristics. A common solution to dynamically add, delete or alter group services is to send messages called peer-group advertisements (PGA), e.g. in XML format, and offer a registration service for the group to manage all its services. A peer that discovers such peer-group information will however not get any information about services currently managed by the registration service until it joins the peer-group and queries the registration for group services.

A disadvantage of this method is that it is not possible to list peer-group services in the PGA. So the peer-group appears like a "black box" to the other peers.

Another drawback is that every alteration of the peer-group characteristics results in a reboot of the peer-group, which affects all peers in that group. In a peer-to-peer based home network, the consumer will inevitably recognize this process and find it annoying.

In WO02/057917, the peer-to-peer platform includes a peer discovery protocol that may allow a peer to discover other peers and PGAs, which are used to describe for a peer-group the group specific information, membership process and the provided peer-group services. This protocol may be used to find members of different kinds of peer-groups, presumably to request membership. Messages are used to get all known, reachable advertisements within a region on the network. A response message returns one or more peer advertisements or PGAs. But not all configuration protocols are visible until the peer has been granted membership or application rights.

SUMMARY OF THE INVENTION

The present invention proposes a new method for dynamic handling of peer-group characteristics. The inventive method enables dynamically changing the characteristics of peer-groups, thus overcoming the mentioned drawbacks of state-of-the-art peer-group concepts.

According to the invention, a new service referred to as "DiscoveryListener" and a new XML element indicating the history of the group identifier (GID), named e.g. "GID_History", are used, both allowing that PGA messages can be published also within the group. These PGA messages can e.g. describe modifications in the peer-group characteristics. The new features can be implemented e.g. as additions to the JXTA protocol, which can be used for the creation and self-organization of peer-groups. JXTA includes usage of messages, such as peer or peer-group advertisements, and services. Conventional peer-groups of this type are static and need restart after any modification, e.g. a new group service. The inventive method for dynamically managing hardware and/or software elements, e.g. services, utilized and/or offered by such peer-groups comprises detecting a change within a peer-group, creating a new peer-group identifier, publishing within the peer-group a first peer-group advertisement message that includes the current and the new peer-group identifier and pointers to current services including the detected modification, accepting the new peer-group identifier by the other peer-group members, and publishing a second peer-group advertisement message in the super-ordinate peer-group, wherein both advertisement messages are usually identical. They may however differ slightly for formal reasons. Thus, peer-groups may operate continuously while peers modify, add or delete services.

In more particular, the inventive method for managing software and/or hardware elements of a peer-group, the peer-group having a first group identifier (GID) assigned and comprising two or more peers, wherein a peer is a software element being associated with one or more hardware elements and has the first GID locally stored, includes the steps of a first peer being a member of said peer-group detecting a modification on a software or hardware element of the peer-group;

the first peer automatically generating a second GID;

the first peer sending out, or publishing, a first PGA message to the other members of the peer-group, the message containing at least the first and second, and optionally further previously outdated GIDs and a pointer to said modified software or hardware element;

peers being members of said peer-group receiving said message, comparing the received first GID with their locally stored current GID and, upon both group identifiers being identical, replacing their locally stored first GID with the second GID; and a peer being a member of said peer-group sending out or publishing a second PGA message, which may be identical to the first PGA message, to members of a second peer-group, which is usually a superordinate peer-group, the second message containing at least the first and second GIDs and a pointer to said modified software or hardware element.

In one embodiment the software elements comprise services and characteristics, the services being executable programs and the characteristics comprising peer-group name, peer-group ID, service description, group description or description of membership process.

In one embodiment the first and second messages are XML formatted and the first and second group identifiers are stored in a separate section of the message, notified e.g. as "GID_HISTORY".

In one embodiment the first peer automatically generates a new, second group identifier or sends the first PGA message only if it is authorized by a security mechanism, e.g. user confirmation.

A device according to the invention is a network element being a peer in a peer-to-peer network, the peer being a member of a peer-group that is defined by a unique group identifier, comprising

- means for storing a current group identifier;
- means for storing a peer identifier;
- means for detecting modification of a software or hardware element relating to the current peer-group;
- means for generating new group identifier upon said detection of modification of software or hardware element;
- means for sending a peer-group advertisement message to other peers, the message containing a data section specifying the current and the new group identifier and a pointer to said modified software or hardware element;
- means for receiving a peer-group advertisement message sent by another peer;
- means for comparing the stored current group identifier with the current group identifier contained in said received peer-group advertisement message, and for indicating both being identical; and
- means for overwriting upon said indication the current group identifier with the received new group identifier.

An advantage of the invention is that seamless operation of a peer is possible in case of changes of the peer-group characteristics, where in a standard JXTA based system the peer-group will have to be rebooted. Thus, the user of such system does not necessarily recognize this process, and is less disturbed.

Another advantage is that peers that intend to join a group may find out which peer-group service will be offered or which requirements it needs to fulfil before joining a group.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the JXTA concept for dynamically managing services for a peer-group.

DETAILED DESCRIPTION OF THE INVENTION

Figure 1:
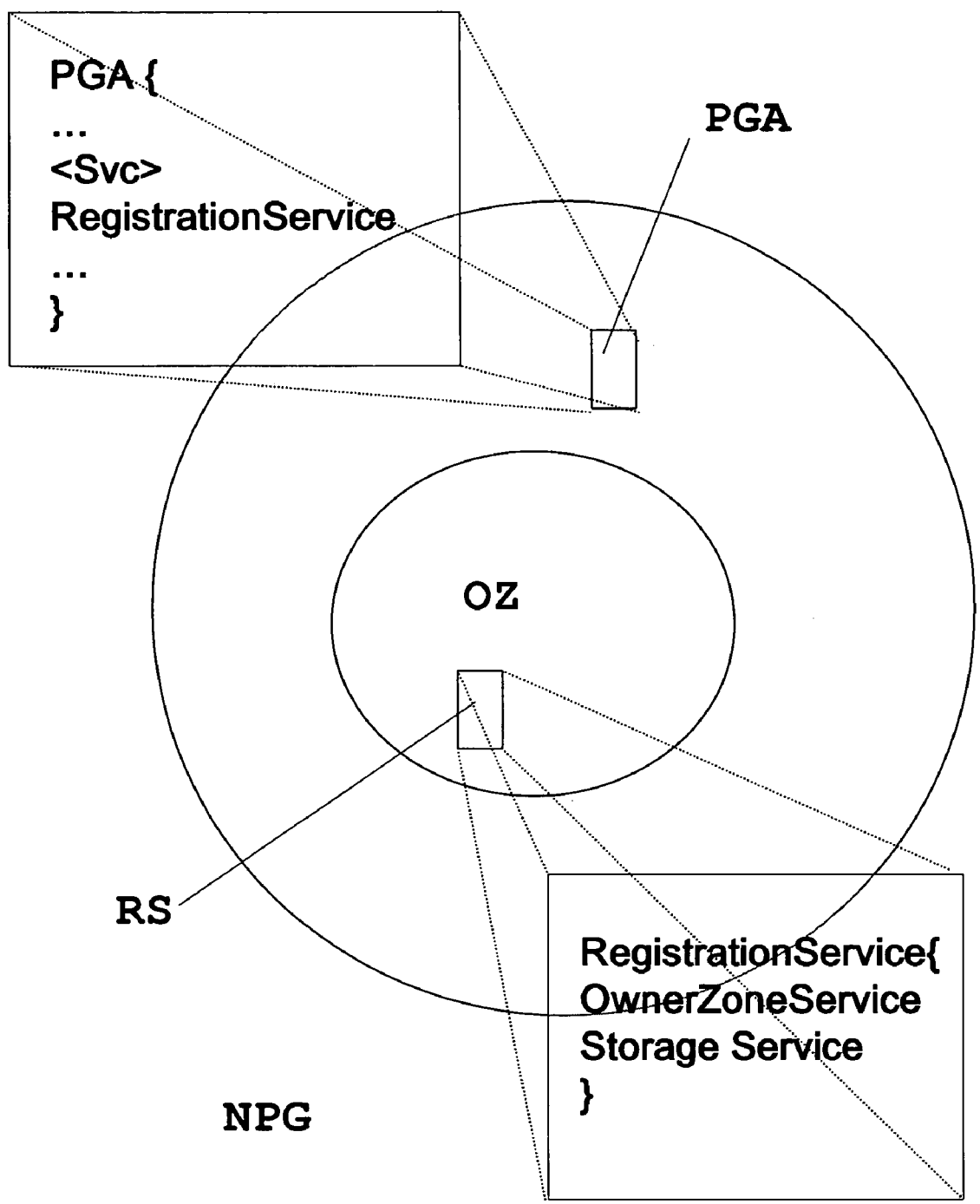

FIG. 1 shows the method JXTA uses for peer-group handling, particularly the concept behind the registration service, which manages all other services. According to JXTA, such registration service is offered for each peer-group. A peer that discovers peer-group information will not get any information about services currently managed by the registration service until it instantiates the peer-group, i.e. joins the peer-group and queries the registration for group services. Within the NetPeerGroup NPG, a default initial peer-group, all group relevant advertisements such as peer-group advertisement (PGA), module implementation advertisement, module specification advertisement and module class advertisement are published. However, in the PGA message only the registration service RS is advertised. A peer that wishes information about other services of the peer-group, e.g. storage service, needs to register with this registration service RS for group membership.

Additionally, the registration service RS publishes the group services within the peer-group, which may be e.g. an OwnerZone OZ. It is therefore not possible for a peer outside the peer-group, e.g. a peer in the NetPeerGroup NPG, to discover all the information without becoming a member of a particular peer-group. The registration service RS handles all modifications related to the services, therefore whenever a peer tries to change one of the services, this has to be done through the registration service RS.

Figure 2:
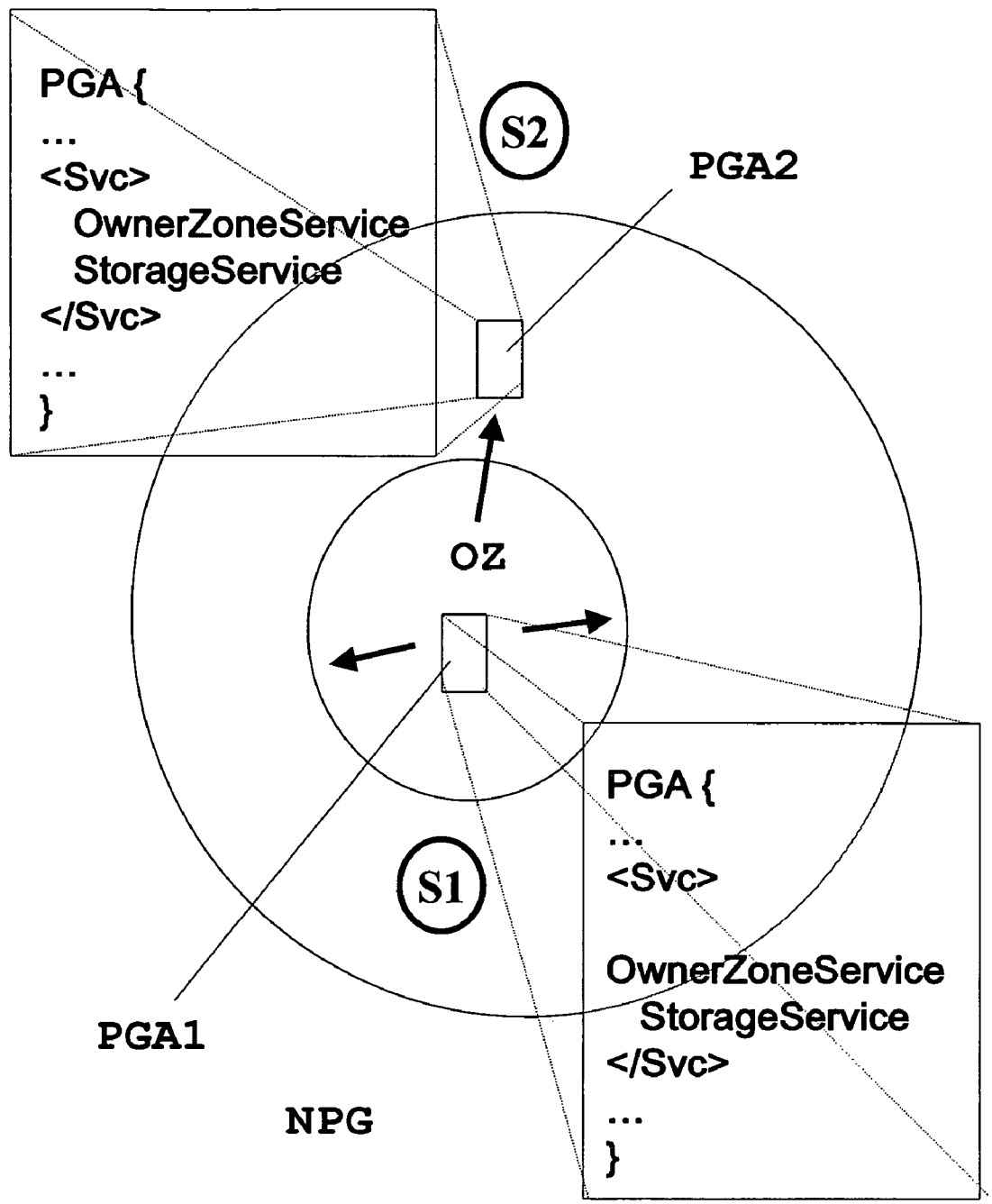
FIG. 2 the distribution of a peer-group advertisement according to the present invention.
Figure 3:
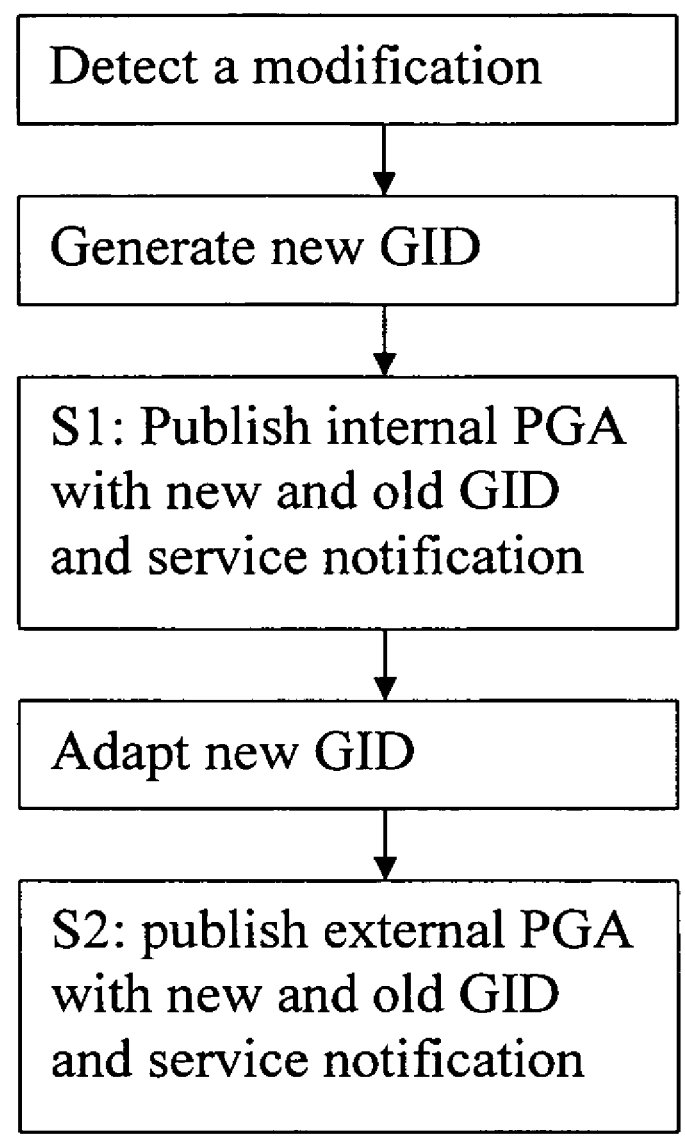
FIG. 3 a flowchart showing one embodiment of the inventive method.

In the following it is described how to dynamically manage peer-groups according to the invention. As a result, the conventional registration service is not needed any more. FIG. 2 shows the corresponding steps for distributing PGA messages. The inventive method is especially suited for home networks, where the connected devices belong to a single household. Such home network may be implemented as an OwnerZone OZ, meaning that group labels that are automatically assigned identify the members of the peer-group. Within an OwnerZone it is defined which peers are allowed to manage or alter the peer-group characteristics. E.g. for the sake of simplicity all peers of the peer-group shall be allowed to manage peer-group characteristics. However, other solutions such as e.g. exclusion of single peers are possible. More details of the OwnerZone concept are given in the European Patent application EP1427149. The inventive method can also be used for other peer-to-peer networks and is compatible with the JXTA protocols specification.

A peer-group can be created within an existing or parent peer-group, e.g. the default NetPeerGroup NPG, which is then a superordinate peer-group. Once a peer-group is created, a related peer-group advertisement (PGA) will be published. Other peers may discover the PGA and join the group in order to access services or contents. If a peer modified either the peer-group descriptive data or added, deleted or modified peer-group services, then according to the invention the following steps will be performed:

First, a peer publishes these changes S1, using the groups PGA via the discovery service within the peer-group. The peer or one of the peers that performed the changes, or another suitable peer may do this. In state-of-the-art systems PGA messages will generally not be published within the own peer-group, because with standard JXTA peer-groups are static. Instead, published PGA messages within a peer-group will be interpreted as creation of a subgroup of the current group. According to the invention, a first PGA message PGA1 is published within the group, and the peers compare a received PGA message PGA1 with their own current peer-group identifier. For this purpose, the peers may use a new service called e.g. DiscoveryListener service to detect if a received PGA message describes their own currently instantiated peer-group. The DiscoveryListener service can detect from the PGA message that it refers to the own peer-group and can foster changes in the group characteristics stored on every peer. The listener compares the new PGA message with the old PGA and modifies the group's instance accordingly, i.e. the characteristics of the current peer-group that it has locally stored. Thus, the peer has always the latest configuration including the current GID of its own peer-group available.

Whenever services are added or modified, additional module advertisements describing the modified service are sent, so that all other group members are able to retrace the modifications. Examples are Module Class Advertisements, Module Specification Advertisements, Module Implementation Advertisements and service specific advertisements. Further in such case, the peer-group ID is commonly changed.

With the inventive method it is also possible that the identifier, or ID, of a group changes dynamically, i.e. without restarting the peer-group. In this case it is not allowed to simply send the new PGA, because for the other peers the PGA would represent a new subgroup, which is not the intended information. Instead the inventive method comprises using a new XML element within the PGA to signal an ID change. Tab. 1 shows the new PGA, based on the JXTA V2.0 protocols specification (http://www.jxta.org).

Tab.1: Peer group advertisement schema

```
1  <xs:element name="PGA" type="jxta:PGA"/>
2  <xs:complexType name = "PGA">
3    <xs:sequence>
4      <xs:element name="GID"  type="jxta:JXTAID"/>
5      <xs:element name="GID_HISTORY"  type="jxta:JXTAID"
                   minOccurs="0"          maxOccurs=
                                          "unbounded" />
6      <xs:element name="MSID"  type="jxta:JXTAID" />
7      <xs:element name="Name"  type="xs:string" minOccurs="0"/>
8      <xs:element name="Desc"  type="xs:anyType"minOccurs=
                                          "0"/>
9      <xs:element name="Svc"   type="jxta:serviceParam"
                   minOccurs="0" maxOccurs="unbounded"/>
10   </xs:sequence>
```

The new element in line 5 named GID_HISTORY is used to accumulate old group identifiers (GIDs). A peer receiving such PGA should use this element to detect a GID change of the current group, which it may have missed. A change of the GID is done e.g. when a new service is offered within a peer-group, so that the PGA is changed. The XML parameters minOccurs/maxOccurs indicate how many GIDs may be in the list. In the example in Tab. 1, the number is not limited. This protocol change is backward compatible, so that peers running an older software version may ignore the GID_History element. On the other hand, peers that are running a new software version may detect a GID change and update the ID in their own PGA and peer advertisement instances.

The second step S2 comprises publishing the new PGA message PGA2 and/or additional advertisements, e.g. module advertisements, in a superordinate group such as the parents group, e.g. NetPeerGroup NPG, so that new peers will instantiate the group according to the new PGA. Thus, peers in the NetPeerGroup NPG have the possibility to find out about services offered within the peer-group without being a member of the peer-group. The services are listed in the "Services" section Svc of the PGA message. Examples for such services are OwnerZoneService or StorageService.

It is possible to publish the PGA with GID_History, anyway in case of a GID change a peer-group or OwnerZone will also publish a new peer-group or OwnerZone advertisement, pointing to the "active" peer-group or OwnerZone.

The distribution of the PGA is exemplary for the other advertisements when peer-group characteristics are changed. The first step of the inventive method is the distribution of advertisements within the peer-group S1. In a second step the advertisement is distributed in the superordinate or parent peer-group S2, e.g. NetPeerGroup NPG, or in one or more further superordinate, i.e. higher-order, peer-groups.

In one embodiment of the invention, the right to manage the peer-group characteristics, in particular the right to generate a new peer-group identifier or publish a PGA message, is restricted by any known security mechanism, so that only selected peers or services can perform changes.

In one embodiment of the invention the first PGA message also contains a list of software and hardware elements of the peer-group, such as e.g. services, and the peers being members of said peer-group store a local copy of such a list or a PGA message of their peer-group, and upon reception of the first PGA message they update their local copy.

In one embodiment the peer-group is not limited to home networks, but spans peers connected to e.g. a Wide Area Network (WAN).

The invention enables seamless operation of a peer in case of changes of the peer-group characteristics, thereby preventing a reboot of the whole peer-group and an interruption of its operation. Further, peers intending to join a particular peer-group may find out in advance which peer-group services will be offered, and/or which it will be requested to offer.

What is claimed is:

1. A method for managing software and/or hardware elements of a peer-group, the peer-group having a first group identifier assigned and comprising two or more peers, wherein a peer is a software element being associated with one or more hardware elements and has the first group identifier locally stored, the method including the following steps:
   a first peer being a member of said peer-group detecting a modification on a software or hardware element of the peer-group;
   the first peer automatically generating a second group identifier;
   the first peer sending out a first message to the other members of the peer-group, the first message containing at least the first and second group identifiers, one or more further previously outdated group identifiers, and a pointer to said modified software or hardware element;
   peers being members of said peer-group receiving said message, comparing the received first group identifier with their locally stored first group identifier and, upon both group identifiers being identical, replacing their locally stored first group identifier with the second group identifier, whereby the second group identifier is assigned as new group identifier to the group and the first group identifier is outdated; and
   a peer being a member of said peer-group sending out a second message to members of a second peer-group, the second message containing at least the first and second group identifiers and a pointer to said modified software or hardware element.

2. Method according to claim 1, wherein the software elements comprise services and characteristics, the services being executable programs and the characteristics comprising peer-group name, peer-group ID, service description, group description or description of membership process.

3. Method according to claim 1, wherein the first message also contains a list of software and hardware elements of the peer-group, and the peers being members of said peer-group store a local copy of a list of software and hardware elements of the peer-group, and upon reception of the first message update their local copy of said list.

4. Method according to claim 1, wherein the first and second messages are XML formatted and the first and second group identifiers are stored in a separate section of the message.

5. Method according to claim 1, wherein the peers belong to a Wide Area Network.

6. Method according to claim 1, wherein the first and second message contains also one or more further previously outdated group identifiers.

7. Method according to claim 1, wherein the peer-group uses the JXTA protocol.

8. Method according to claim 1, wherein the peers send out peer advertisement messages, and upon reception of said second peer group identifier include it into their peer advertisement messages.

9. Method according to claim 1, wherein the first peer sends the first message only if it is authorized by a security mechanism.

* * * * *